US012693793B2

(12) United States Patent
Lu

(10) Patent No.: US 12,693,793 B2
(45) Date of Patent: Jul. 28, 2026

(54) DATA CONVERSION CIRCUIT AND MEMORY DEVICE

(71) Applicant: CXMT CORPORATION, Hefei (CN)

(72) Inventor: Tianchen Lu, Hefei (CN)

(73) Assignee: CXMT CORPORATION, Hefei City (CN)

( * ) Notice: Subject to any disclaimer, the term of this patent is extended or adjusted under 35 U.S.C. 154(b) by 89 days.

(21) Appl. No.: 18/820,286

(22) Filed: Aug. 30, 2024

(65) Prior Publication Data

US 2024/0419337 A1 Dec. 19, 2024

Related U.S. Application Data

(63) Continuation of application No. PCT/CN2022/124046, filed on Oct. 9, 2022.

(30) Foreign Application Priority Data

Jun. 28, 2022 (CN) .......................... 202210740306.5

(51) Int. Cl.
*G06F 3/06* (2006.01)
*G06F 11/10* (2006.01)
(Continued)

(52) U.S. Cl.
CPC .......... *G06F 3/0619* (2013.01); *G06F 3/0659* (2013.01); *G06F 3/0673* (2013.01); *G06F 12/0802* (2013.01)

(58) Field of Classification Search
CPC .............................. G06F 3/0673; G06F 11/079
See application file for complete search history.

(56) References Cited

U.S. PATENT DOCUMENTS 4,750,167 A    6/1988  Meyer
8,947,276 B1 *  2/2015  Yu ....................... H03M 1/1071
                                                          341/120
(Continued)

FOREIGN PATENT DOCUMENTS

KR        20120109841 A    10/2012

OTHER PUBLICATIONS

The Extended European Search Report issued in European corresponding application No. 22948996.8 mailed on Jun. 2, 2025, 8 pages.

*Primary Examiner* — Getente A Yimer
(74) *Attorney, Agent, or Firm* — Syncoda LLC; Feng Ma

(57) ABSTRACT

Provided are a data conversion circuit and a memory device. The data conversion circuit includes a data cache module, a selective output module, and a detection module. The data cache module is configured to receive a multi-bit parallel first signal, where the first signal includes a first data signal and a first check code signal. The detection module is configured to receive a read command signal, and output a corresponding enable signal according to a signal required to be transmitted currently being the first data signal or the first check code signal, where the enable signal includes a first enable signal corresponding to the first data signal or a second enable signal corresponding to the first check code signal. The selective output module is configured to receive the first signal and selectively output the first data signal or the first check code signal based on the enable signal.

16 Claims, 8 Drawing Sheets

(51) Int. Cl.

| | |
|---|---|
| *G06F 12/0802* | (2016.01) |
| *G06F 13/16* | (2006.01) |
| *G11C 7/10* | (2006.01) |
| *G11C 7/22* | (2006.01) |
| *G11C 11/4096* | (2006.01) |
| *G11C 29/02* | (2006.01) |
| *G11C 29/04* | (2006.01) |

(56)                    References Cited

U.S. PATENT DOCUMENTS

2007/0120720 A1*  5/2007  Xu ..................... H03M 1/1042
                                                341/155
2010/0026380 A1*  2/2010  Chen ......................... G05F 1/46
                                                327/544
2010/0117877 A1*  5/2010  Sutardja .............. H03M 1/1019
                                                341/120
2010/0328124 A1*  12/2010  O'Donnell .......... H03M 1/0836
                                                341/143
2019/0115937 A1*  4/2019  Lee ....................... G06F 11/079
2023/0384945 A1*  11/2023  Du ........................ G06F 3/0673

* cited by examiner

DATA CONVERSION CIRCUIT AND MEMORY DEVICE

CROSS-REFERENCES TO RELATED APPLICATIONS

This is a continuation of International Patent Application No. PCT/CN2022/124046, filed on Oct. 9, 2022, which claims the priority to Chinese Patent Application No. 202210740306.5, titled "DATA CONVERSION CIRCUIT AND MEMORY DEVICE", filed with the China National Intellectual Property Administration (CNIPA) on Jun. 28, 2022, the disclosures of which are incorporated herein by reference in its entirety.

TECHNICAL FIELD

The present disclosure relates to a memory technology, and in particular, to a data conversion circuit and a memory device.

BACKGROUND

With the development of memory technology, the data transmission speed of a memory has been improved. For example, in a dynamic random access memory (DRAM), double data rate 5 (DDR5) provides a new type of read data. That is, the read data consists of a data part and a check code part.

Along with the format update of the read data, how to implement effective read conversion for the read data in this format has become a problem that needs to be considered.

SUMMARY

Embodiments of the present disclosure provide a data conversion circuit and a memory device.

According to some embodiments, a first aspect of the present disclosure provides a data conversion circuit, including: a data cache module, a selective output module, and a detection module, where the data cache module is configured to receive a multi-bit parallel first signal, where the first signal includes a first data signal and a first check code signal; the detection module is configured to receive a read command signal, and output a corresponding enable signal according to a signal required to be transmitted currently being the first data signal or the first check code signal, where the enable signal includes a first enable signal corresponding to the first data signal or a second enable signal corresponding to the first check code signal; and the selective output module is coupled to the data cache module and the detection module, and is configured to receive the first signal and selectively output the first data signal or the first check code signal based on the enable signal.

According to some embodiments, a second aspect of the present disclosure provides a memory device, including a memory array, a sense amplifier circuit, and the data conversion circuit as described in any example above, where in a read mode, a multi-bit parallel first signal is generated by the sense amplifier circuit from data stored in the memory array, and transmitted to the data conversion circuit, where the first signal includes a first data signal and a first check code signal.

BRIEF DESCRIPTION OF THE DRAWINGS

The accompanying drawings incorporated into the specification and constituting part of the specification illustrate the embodiments of the present disclosure, and serve, together with the specification, to explain the principles of the embodiments of the present disclosure.

Specific embodiments of the present application are shown by using the accompanying drawings and are described below in more detail. The accompanying drawings and text description are not intended to limit the scope of the concept of the present application in any manner, but to explain the concept of the present application for those skilled in the art with reference to specific embodiments.

DETAILED DESCRIPTION

Exemplary embodiments are described in detail herein, and examples thereof are represented in the accompanying drawings. When the following descriptions relate to the accompanying drawings, unless otherwise stated, same numerals in different accompanying drawings represent same or similar elements. Implementations described in the following exemplary embodiments do not represent all implementations consistent with the present disclosure. On the contrary, the implementations are merely examples of apparatuses and methods that are described in detail in the appended claims and consistent with some aspects of the present disclosure.

The terms "includes" and "has" in the present disclosure are used to indicate an open-ended inclusion and to mean that additional elements/components/and the like may exist in addition to the listed elements/components/and the like. The terms "first", "second", and the like are merely used as markers, not as quantitative restrictions on objects thereof.

In addition, the different elements and regions in the accompanying drawings are shown schematically only, and therefore the present disclosure is not limited to the sizes or distances shown in the accompanying drawings.

The technical solution of the present disclosure will be described in detail below with reference to specific embodiments. The following specific embodiments may be combined with each other, and the same or similar concepts or processes may not be repeatedly described in some embodiments. The embodiments of the present disclosure will be described in detail below with reference to the drawings.

Figure 1:
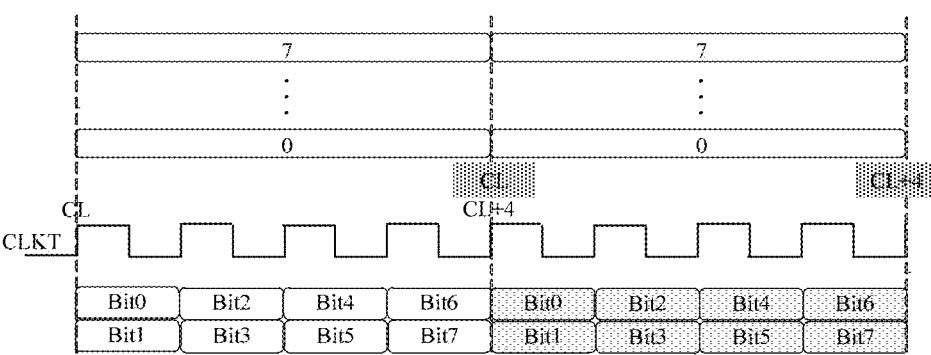
FIG. 1 is a schematic diagram of data conversion timing of a DDR4 memory according to an embodiment.

FIG. 1 is a schematic diagram of data conversion timing of a DDR4 memory according to an embodiment. In practical applications, when DDR4 is read, read data includes data information, the data information may be four bits or eight bits, and the maximum speed of data transmission is 3.2 GHz. As shown in FIG. 1, taking 8-bit parallel data as an example, CLKT is a system clock signal. For example, in the DDR4 memory, one clock cycle is 625 ps. With reference to the figure, it takes four clock cycles (CL to CL+4 in the figure) to perform each read operation.

In the exemplified DDR4 data conversion design, the read 8-bit data is first converted into two-channel data. With reference to the figure, a row where Bit 0 is located is one channel of data, and a row where Bit 1 is located is another channel of data. That is to say, the 8-bit data is firstly converted into four pieces of two-bit data, which are sequentially outputted in different clock cycles. For example, according to the design shown in the figure, the read data (Bit0-Bit7) is converted into four pieces of two-bit data, namely Bit0-Bit1, Bit2-Bit3, Bit4-Bit5, and Bit6-Bit7. Moreover, the four pieces of two-bit data are sequentially outputted in four clock cycles of CL to CL+4. In each clock cycle, the two-bit data in this clock cycle is converted to serial data to be outputted, thereby implementing series-to-parallel processing of the read data. For a single channel of one-bit data, the data valid window is one clock cycle, namely about 625 ps, which can generally support the establishment time of a last-stage latch to implement data reading. The shaded part in the figure represents a relevant example of the next read data, and CL to CL+4 with shaded marks represent time periods for conversion and transmission of the next read data. To check the read data, it is possible to provide the read data including data and a check code. For example, in some cases, DDR5 introduces the concept of cyclic redundancy check (CRC) reading. Along with the format update of the read data, it is necessary to implement effective read conversion for the read data in this format.

Some aspects of the embodiments of the present disclosure relate to the considerations above. Examples of the solution are described below with reference to some embodiments of the present disclosure.

Embodiment 1

Figure 2:
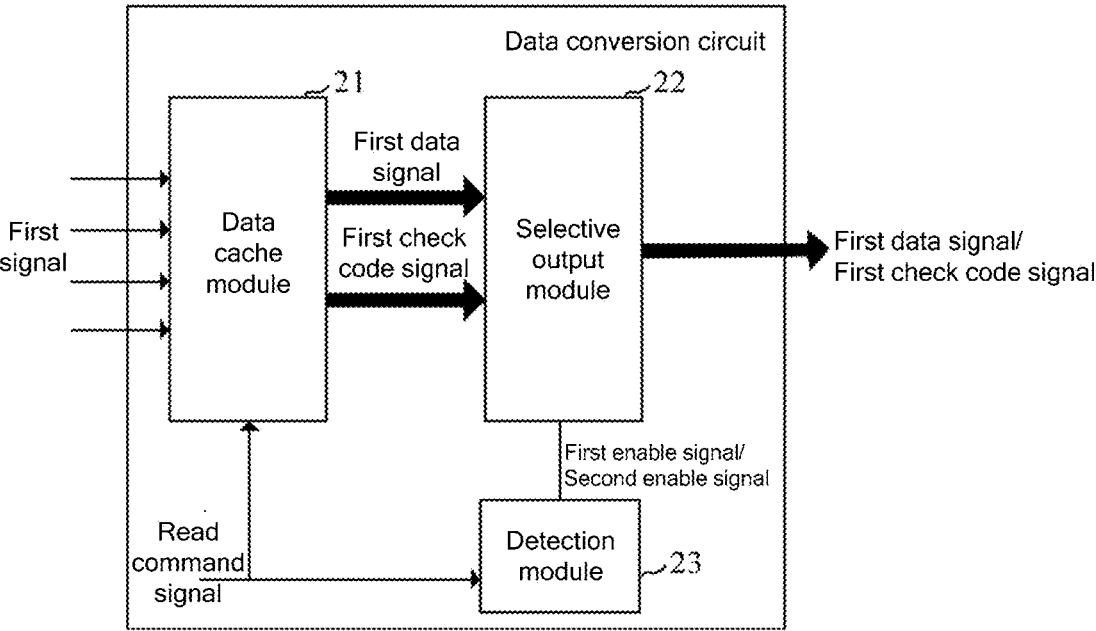
FIG. 2 is a schematic structural diagram of a data conversion circuit according to an embodiment.

FIG. 2 is a schematic structural diagram of a data conversion circuit according to an embodiment. As shown in FIG. 2, the data conversion circuit includes a data cache module 21, a selective output module 22, and a detection module 23.

The data cache module 21 is configured to receive a multi-bit parallel first signal, where the first signal includes a first data signal and a first check code signal.

The detection module 23 is configured to receive a read command signal, and output a corresponding enable signal according to a signal required to be transmitted currently being the first data signal or the first check code signal, where the enable signal includes a first enable signal corresponding to the first data signal or a second enable signal corresponding to the first check code signal.

The selective output module 22 is coupled to the data cache module and the detection module, and is configured to receive the first signal and selectively output the first data signal or the first check code signal based on the enable signal.

In actual application, the data conversion circuit provided in this embodiment may be applied to various memories. For example, the data conversion circuit may be applied to, but not limited to, a DDR RAM, etc.

In actual application, to check the read data, the read data including data and a check code is provided. In one example, the first signal is eighteen-bit data, the first data signal is sixteen-bit data, and the first check code signal is two-bit data.

Figure 3:
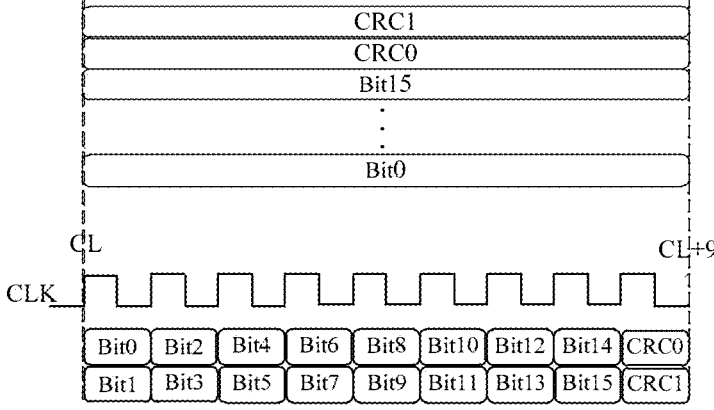
FIG. 3 is a schematic diagram of data conversion timing according to an example.

Taking DDR5 as an example, in actual application, when DDR5 is read, the read data has 18 bits, where first 16 bits are data information, and last two bits are check code information. Taking an example where the read data has 18 bits, as shown in FIG. 3, FIG. 3 is a schematic diagram of data conversion timing according to an example, and 18-bit read data is taken as an example in the figure. As shown in the figure, Bit0-Bit15, CRC0, and CRC1 constitute an 18-bit parallel read data, namely a first signal.

In practical applications, whether the read data includes a CRC bit may be determined based on the enabling status of a mode register of a memory. For example, if the mode register enables a CRC function, the read data carries the CRC bit. In the data transmission process, to avoid errors in the read data caused by errors in the transmission process, it is necessary to check or detect the read data. CRC is a method for checking the accuracy of data transmission, which establishes an agreed relationship between data bits and check bits through a certain mathematical operation. After the CRC bit is included in transmitted data in the read data, the data read subsequently may be configured to perform check calculation on the transmitted data based on the value of the CRC bit, to avoid errors in the read data in the transmission process, thereby further ensuring the accuracy of data reading.

As shown in FIG. 3, taking 18-bit parallel data as an example, CLK is a system clock signal. For example, in DDR5, one clock cycle is about 312.5 ps. With reference to the figure, it takes nine clock cycles (CL to CL+9 in the figure) to perform each read operation. In the period of first eight clocks since receiving the read command signal, the signal required to be transmitted is a data signal, and the detection module 23 outputs the first enable signal corresponding to the data signal, to control the selective output module 22 to selectively output data signals Bit0-Bit15. In the period of the last clock, the signal required to be transmitted is a check code signal, and at this time, the detection module 23 outputs the second enable signal corresponding to the check code signal, to control the selective output module 22 to selectively output check code signals CRC0 and CRC1. The implementation modes of the first enable signal and the second enable signal are not limited. For example, the two may be independent signals, or the two may be represented by different states of a same signal. For example, when the enable signal is in a high-level state, the first enable signal is represented; and when the enable signal is in a low-level state, the second enable signal is represented.

It should be noted that the figure is only an example, and the parallel signals are sequentially outputted by outputting a two-bit signal at a time, but it can be understood that other possible implementation modes can also be adopted. For example, these two-bit signals outputted by the selective output module may be further converted to the serial data Bit0-CRC1 shown in the figure above.

Figure 4:
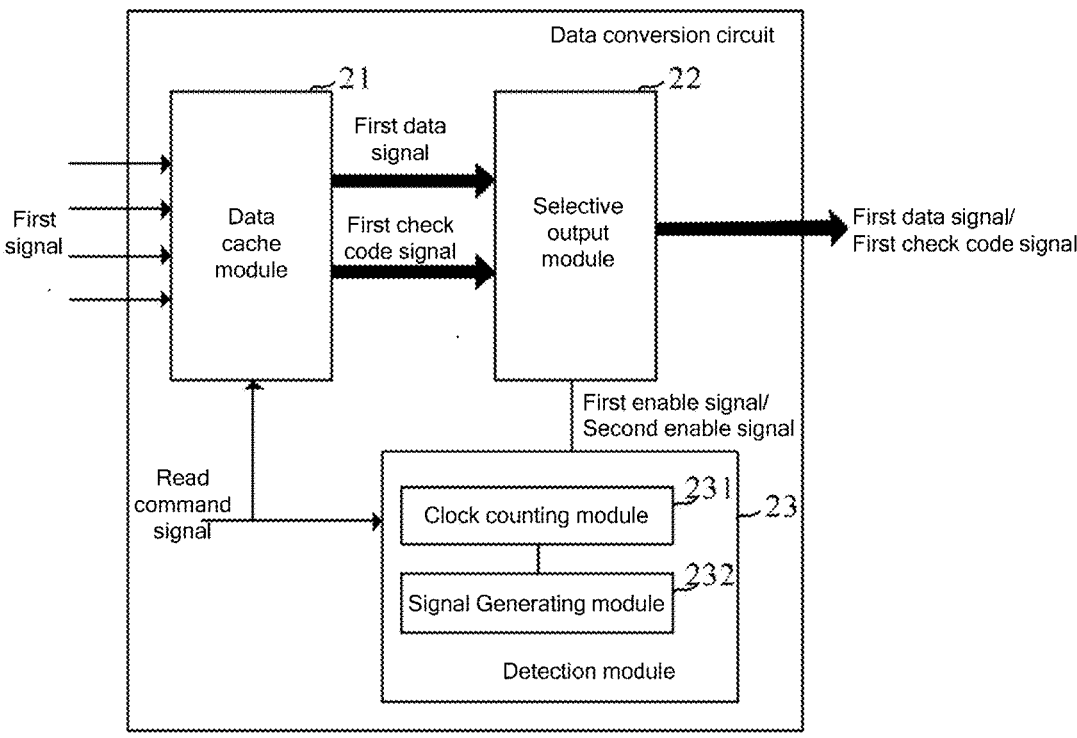
FIG. 4 is a schematic structural diagram of a data conversion circuit according to an embodiment.

To implement the output of signal enable, in an example, FIG. 4 is a schematic structural diagram of a data conversion circuit according to an embodiment. As shown in FIG. 4, based on any example, the detection module 23 includes a clock counting module 231 and a signal generating module 232.

The clock counting module 231 is configured to clear and count, when receiving a read command signal, the number of system clock cycles since receiving the read command signal.

The signal generating module 232 is coupled to the clock counting module 231, and is configured to output the first enable signal when the number of system clock cycles counted by the clock counting module 231 does not reach a first threshold, and output the second enable signal when the number of system clock cycles counted by the clock counting module 231 reaches the first threshold, where the first threshold is set based on the number of system clock cycles needed to transmit the first data signal.

The first threshold refers to the number of system clocks required by the selective output module to transmit the data signal in the read data, and the number of system clocks depends on a length of the data signal. Referring to the previous example in FIG. 3, it is assumed that the length of the data signal is 16 bits, and the number of system clocks required to complete the transmission of the data signal is 8. Referring to this example, the first threshold may be set to be 8. After the first threshold is determined, it can be determined by counting the number of elapsed system clocks to determine the data signal or check code signal required to be transmitted currently.

In one example, as shown in FIG. 3, the selective output module firstly transmits the data signal and then transmits the check code signal. That is to say, since receiving the read command signal, i.e., after starting to output the read data, the data signal needs to be transmitted in the first eight clocks, and the check code signal needs to be transmitted in the last one clock. Accordingly, the clock counting module 231 clears and counts the number of system clock cycles elapsed since receiving the read command signal. At this time, the signal generating module 232 detects that the number of clocks counted by the clock counting module 231 is less than 8, the first enable signal corresponding to the data signal is outputted, to control the selective output module 22 to output the data signal. Thereafter, when the number of clocks counted by the clock counting module 231 is 8, the signal generating module 232 starts to output the second enable signal corresponding to the check code signal from the next clock, to control the selective output module 22 to output the check code signal.

It should be noted that the above example is only an example, and other possible modes are not excluded. For example, the specific value of the first threshold may be determined according to the actual situation. For another example, the check code signal may also be transmitted firstly and then the data signal is transmitted. Correspondingly, the first threshold and the output of the signal generating module are adjusted accordingly. The above specific means are not limited herein.

In this embodiment, the detection module includes a clock counting module and a signal generating module. Through a clock statistical result of the clock counting module, it can be accurately and timely determined that the signal required to be transmitted currently is a data signal or a check code signal, such that the signal generating module can be controlled in time to output the first enable signal or the second enable signal accordingly, and the data can be accurately transmitted.

Figure 5:
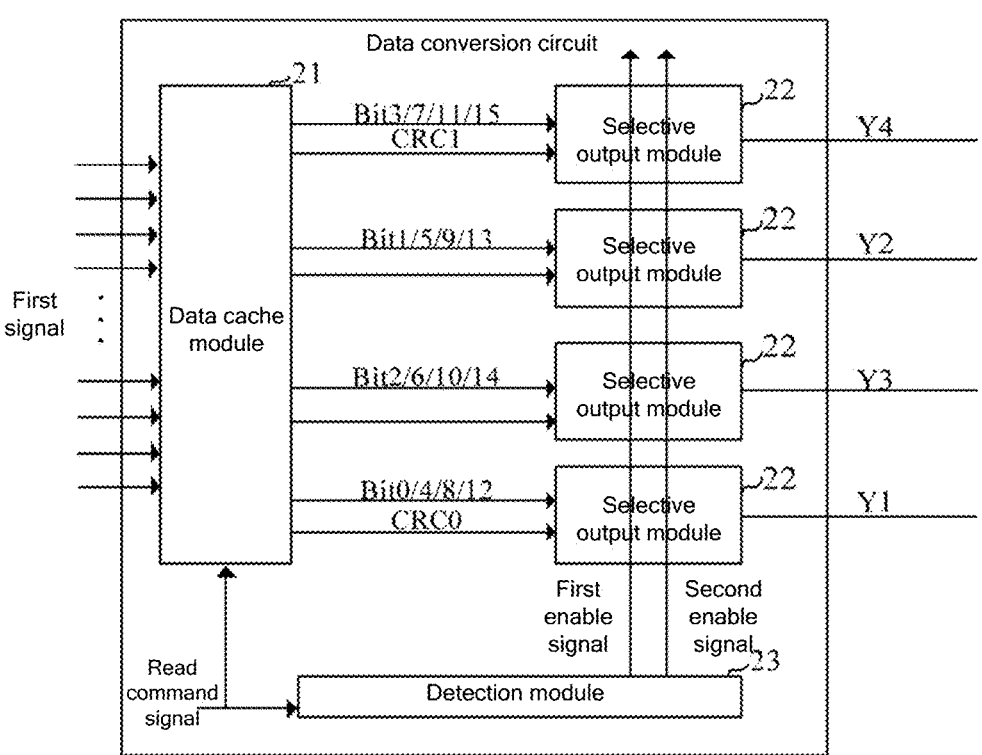
FIG. 5 is a schematic structural diagram of a data conversion circuit according to an embodiment.

In practical applications, it is also necessary to consider the effect of the data transmission cycle on data reading. For example, the data transmission speed of DDR5 is doubled compared with that of DDR4, so the data transmission window (data valid window) is shortened to half of the original. Therefore, to avoid affecting the data reading effect due to the short data transmission window, in an example, FIG. 5 is a schematic structural diagram of a data conversion circuit according to an embodiment. As shown in FIG. 5, based on any example, there are N selective output modules 22.

The data cache module 21 is specifically configured to divide the first data signal into N data sub-signals and divide the first check code signal into M check code sub-signals according to bits.

The data cache module 21 is further specifically configured to respectively output the data sub-signals and the check code sub-signals to the N selective output modules 22 in a manner of outputting the first signal in parallel, where a data volume in each data sub-signal does not exceed the number of the selective output modules 22.

The number of the selective output modules can be determined according to the required data valid window. For example, the data valid window can be set to be not less than 625 ps to ensure accurate reading of data. Taking DDR5 as an example, the data valid window is set to be two system clock cycles, namely 625 ps, thereby avoiding data reading failure due to too small data valid window.

Figure 6:
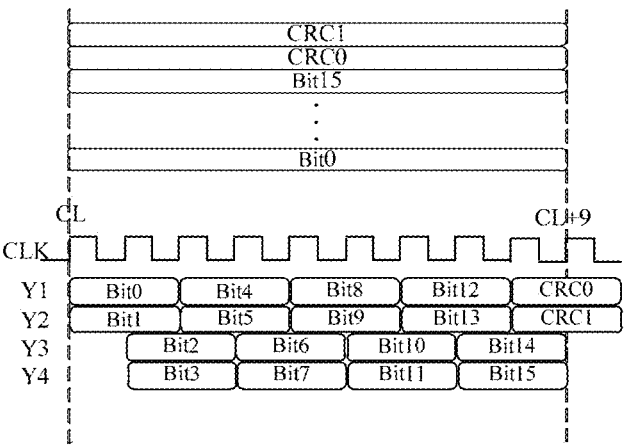
FIG. 6 is a schematic diagram of data conversion timing according to an example.

Referring to an example, in practical applications, different types of memories may have different data transmission speeds and different system clock cycles. The duration of single data reading operation can be pre-designed. For example, taking DDR4 as an example, the system clock cycle (CLK) of one DDR4 is about 625 ps. Assuming that there are two selective output modules, 8-bit data needs to be outputted in 4 CLKs. Taking DDR5 as an example, as shown in FIG. 3 and FIG. 6, the CLK of one DDR5 is about 312.5 ps. Assuming that there are two selective output modules, 18-bit data needs to be outputted in 9 CLKs. The data valid window is too small, so it is considered to set the reading duration of single data to be two CLKs of DDR5, namely about 312.5×2=625 ps. Assuming that there are four selective output modules, 18-bit data needs to be outputted in 9 CLKs. Based on the designed reading duration of single read data, in combination with the required data valid window, the number of selective output modules can be determined.

In one example, there are four selective output modules. Taking an example where the data valid window is set to be 625 ps, it can be seen that for 18-bit read data, it is necessary to complete the transmission of the 16-bit data signal through four transmissions within eight system clock cycles, and complete the transmission of the check code signal once. That is to say, four-bit data needs to be outputted each time, so the number of the selective output modules can be set to be four, and the four selective output modules respectively output one-bit data signal each time. That is, the four-bit data signal is outputted in parallel each time until the transmission of the 16-bit data signal is completed by four transmissions. Thereafter, two of the selective output modules respectively output one-bit check code signal. That is, two-bit check code signal is transmitted by one transmission. In the above solution, since the data valid window is guaranteed to meet the predetermined requirement, data reading failure can be avoided.

To facilitate the data transmission, in one example, sequential logic of a plurality of the selective output modules 22 is configured; and the data cache module 21 is specifically configured to output the first signal to the corresponding selective output modules according to the sequential logic.

As shown in FIG. 5 and FIG. 6, FIG. 6 is a schematic diagram of data conversion timing according to an example, and 18-bit read data is taken as an example in the figure. Y1-Y4 represent the outputs of the plurality of selective output modules 22. Referring to the figures, Bit0-Bit3 represent first data sub-signals, Bit4-Bit7 represent second data sub-signals, Bit8-Bit11 represent third data sub-signals, Bit12-Bit15 represent fourth data sub-signals, and CRC0 and CRC1 respectively represent a first check code sub-signal and a second check code sub-signal. In the above solution, since the data valid window is guaranteed to meet the predetermined requirement in the data conversion process, data reading failure can be avoided.

Figure 7:
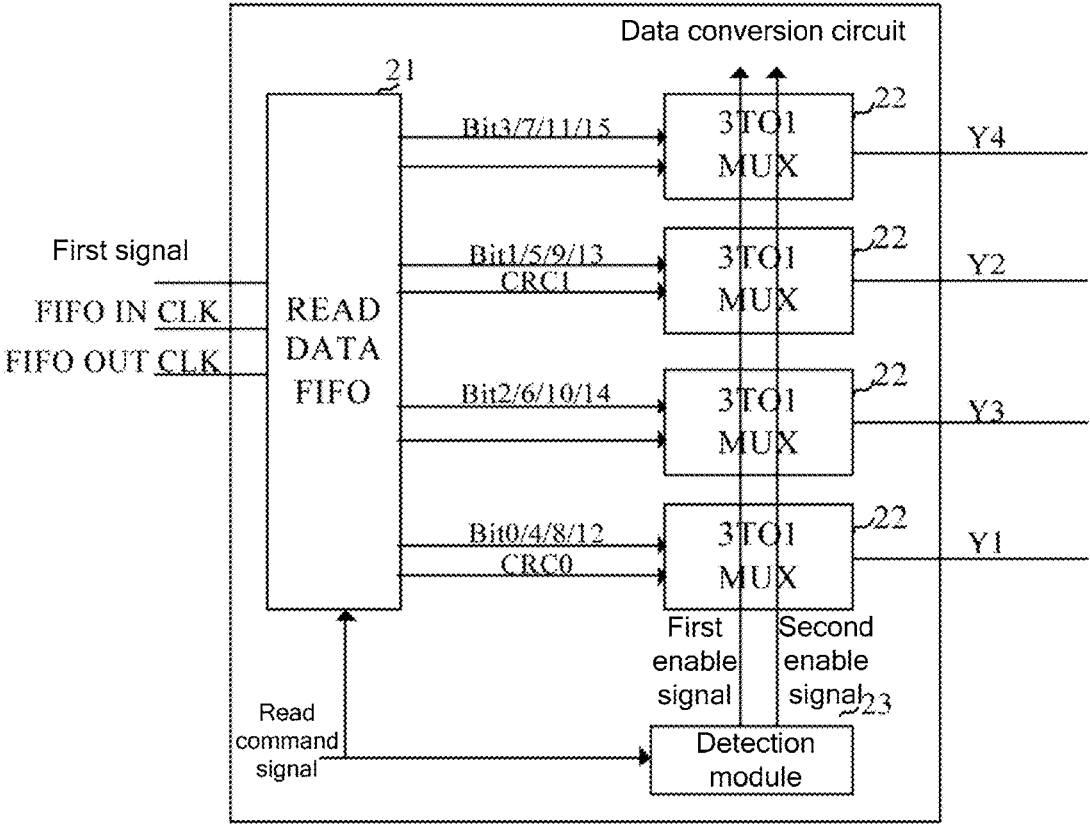
FIG. 7 is a schematic structural diagram of a data conversion circuit according to an embodiment.

In one example, as shown in FIG. 7, FIG. 7 is a schematic structural diagram of a data conversion circuit according to an embodiment. The data cache module 21 includes a first-in first-out (FIFO) data cache (READ DATA FIFO in the figure), where the FIFO data cache includes a data input terminal configured to receive the first signal, an input clock signal terminal (FIFO IN CLK in the figure), and an output clock signal terminal (FIFO OUT CLK in the figure). In one example, the selective output module may include a three-to-one data selector (3TO1 MUX in the figure).

Still referring to the schematic diagram of timing shown in FIG. 6, the structure shown in FIG. 7 is described and exemplified: the sequential logic of the plurality of selective output modules 22 is preset, namely the sequence of Y1, Y2, Y3 and Y4 in the figure. After receiving the parallel first signal, the data cache module 21 inputs each bit data of the first signal into the corresponding selective output module 22 according to the sequence of Y1, Y2, Y3 and Y4. For example, firstly, the selective output module sequentially outputs Bit0-Bit3 of the first signal according to Y1, Y2, Y3 and Y4 in two system clock cycles, and then sequentially outputs Bit4-Bit7 of the first signal according to Y1, Y2, Y3 and Y4 in the following two system clock cycles, until Bit0 to Bit15 of the first signal are all outputted. After that, CRC0 and CRC1 of the first signal are sequentially outputted on Y1 and Y2. In the figure, to facilitate subsequent bit-reduction-conversion processing, a delay of one system clock cycle is added between Bit0, Bit1 and Bit2, Bit3.

In this example, the data cache module includes a first-in first-out data cache, thereby simplifying the circuit structure and at the same time implementing data read conversion.

Figures 8, 9:
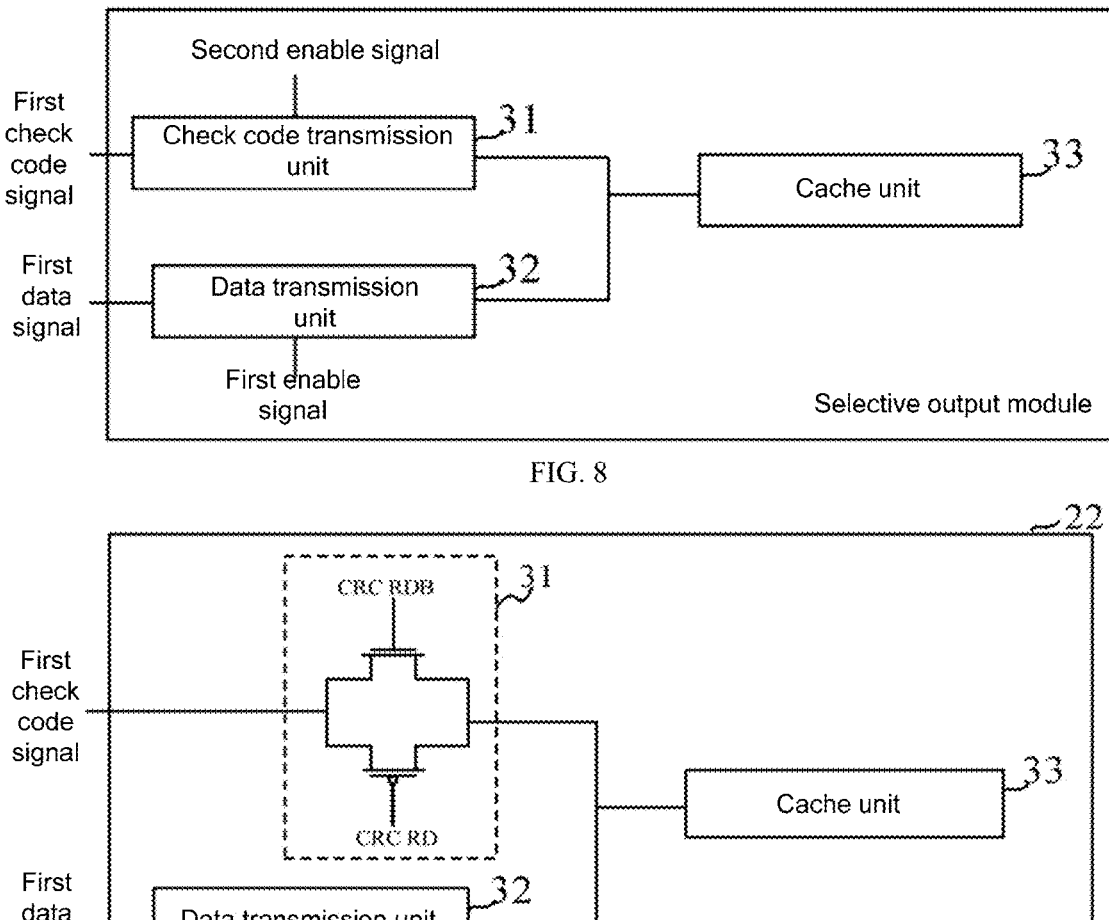
FIG. 8 is a schematic structural diagram of a selective output module according to an example.
FIG. 9 is a schematic structural diagram of a selective output module according to an example.

Specifically, the selective output module is configured to perform selective outputting based on the enable signal, and the implementation mode is not limited. In one example, as shown in FIG. 8, FIG. 8 is a schematic structural diagram of a selective output module according to an example. As shown in the figure, the selective output module 22 includes a check code transmission unit 31 and a data transmission unit 32.

The check code transmission unit 31 is coupled to the data cache module 21, has a control terminal configured to receive the second enable signal, and is configured to receive the first check code signal and output the first check code signal when the second enable signal is valid.

The data transmission unit 32 is coupled to the data cache module 21, has a control terminal configured to receive the first enable signal, and is configured to receive the first data signal and output the first data signal when the first enable signal is valid.

Specifically, the check code transmission unit is configured to transmit the check code signal, and the data transmission unit is configured to transmit the data signal. The check code transmission unit turns on a transmission path in response to the second enable signal, and the data transmission unit turns on the transmission path in response to the first enable signal. Activating the enable signal indicates that the level state of the enable signal is valid, and at this time, the corresponding transmission unit can be controlled to turn on the transmission path. For example, both the first enable signal and the second enable signal are valid at a low level, then when the current level state of the enable signal is high level, the enable signal is in an inactive state, and when the current level state is low level, the enable signal is in an active state. Optionally, the selective output module 22 may further include a cache unit 33 coupled to the check code transmission unit 31 and the data transmission unit 32, and configured to cache and output a signal received currently.

Regarding the check code transmission unit, in one example, the check code transmission unit 31 includes a first transmission gate, where the first transmission gate has a control terminal configured to receive the second enable signal, and is turned on to output the first check code signal when the second enable signal is valid. Due to the transmission gate structure, the check code transmission unit can improve the efficiency of data transmission and reduce power consumption.

Referring to the example above, for example, as shown in FIG. 9, FIG. 9 is a schematic structural diagram of a selective output module according to an example. As shown in the figure, the check code transmission unit 31 includes a first transmission gate. The first transmission gate includes a first P-channel metal oxide semiconductor (PMOS) transistor and a first N-channel metal oxide semiconductor (NMOS) transistor.

A source of the first PMOS transistor is connected to a drain of the first NMOS transistor and the data cache module 21.

A drain of the first PMOS transistor is connected to a source of the first NMOS transistor and the cache unit 33. A gate of the first PMOS transistor is connected to a second enable signal CRC RD. A gate of the first NMOS transistor is connected to an inverted signal CRCRDB of the second enable signal.

Specifically, when being in a low-level state, the second enable signal is in a valid state. The transmission gate structure constituted by the first PMOS transistor and the first NMOS transistor in the check code transmission unit is turned on, and a signal is transmitted to the cache unit 33 through the turned-on transmission gate structure for caching and is outputted by the selective output module.

In this example, the check code transmission unit is composed of a transmission gate constituted by a PMOS transistor and an NMOS transistor. The check code transmission unit is implemented through a conventional device, such that the circuit structure can be further simplified, the integration level is improved, and the cost is reduced.

Regarding the data transmission unit, in one example, the data transmission unit 32 includes a first flip-flop 322 and a second transmission gate 323, where the first flip-flop 322 has a data terminal configured to receive the first data signal, a clock terminal configured to receive the system clock signal, and an output terminal coupled to an input terminal of the second transmission gate 323; and the second transmission gate 323 has a control terminal configured to receive the first enable signal, and is turned on to output the first data signal when the first enable signal is valid. Due to the flip-flop and the transmission gate structure, the data transmission unit can improve the efficiency of data transmission and reduce power consumption.

Figure 10:
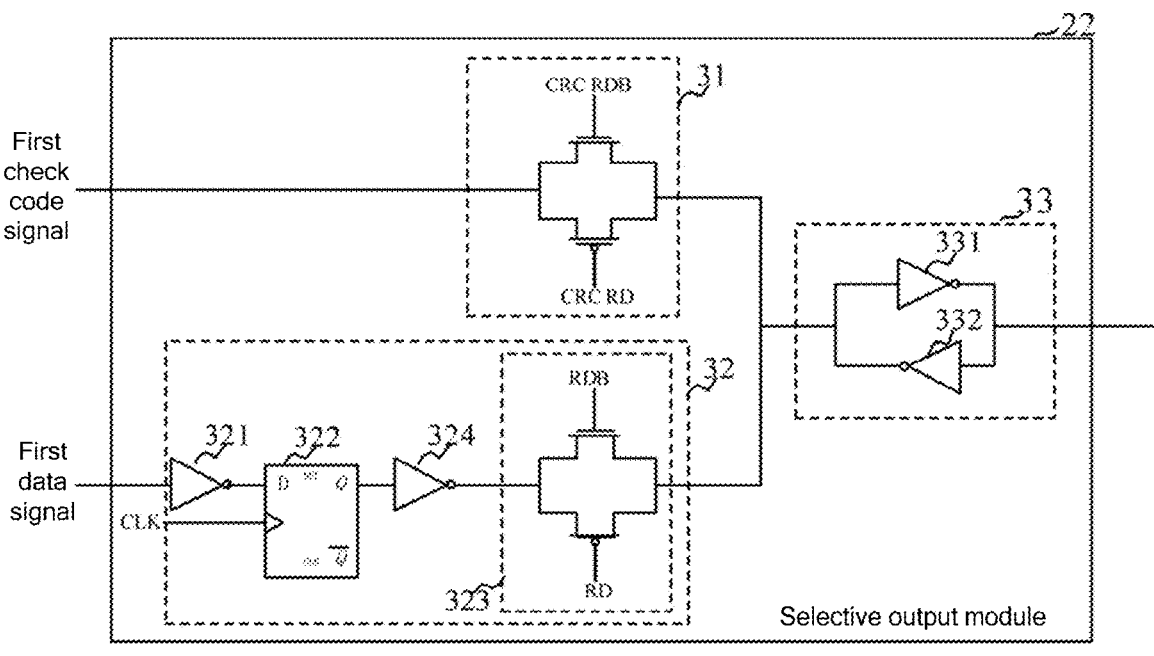
FIG. 10 is a schematic structural diagram of a selective output module according to an example.

Referring to the example above, for example, as shown in FIG. 10, FIG. 10 is a schematic structural diagram of a selective output module according to an example. As shown in the figure, the data transmission unit 32 includes a second inverter 321, a first flip-flop 322, a second transmission gate 323, and a third inverter 324, the second transmission gate 323 includes a second PMOS transistor and a second NMOS transistor.

The second inverter 321 has an input terminal connected to the data cache module 21 and an output terminal connected to an input terminal of the first flip-flop 322.

The first flip-flop 322 has a clock terminal connected to the system clock signal and an output terminal connected to an input terminal of the third inverter 324. An output terminal of the third inverter 324 is connected to a source of the second PMOS transistor and a drain of the second NMOS transistor.

The second PMOS transistor has a drain connected to a source of the second NMOS transistor and the cache unit 33, and a gate connected to the first enable signal RD. A gate of the second NMOS transistor is connected to an inverted signal DRB of the first enable signal.

Specifically, when being in a low-level state, the first enable signal is in an active state. The transmission gate structure constituted by the second PMOS transistor and the second NMOS transistor in the data transmission unit is turned on, and the data signal is transmitted to the cache unit 33 through the turned-on transmission gate structure for caching and is outputted by the selective output module. The flip-flop is configured to regularly output, in response to the system clock signal, the data signal currently outputted by the data cache module, which can avoid wrong turn-on and wrong turn-off of the transmission gate due to factors such as transmission delay of the first enable signal, thereby improving the reliability of data conversion. It can be understood that under the control of the first enable signal and the second enable signal, the data signal or the check code signal in the first signal can be selectively outputted.

The inverter in the above example mainly serves as a buffer, so the second inverter and the third inverter may not be provided in a possible implementation. In this example, the data transmission unit is composed of an inverter, a flip-flop, a PMOS transistor and an NMOS transistor. The data transmission unit is implemented through a conventional device, such that the circuit structure can be further simplified, the integration level is improved, and the cost is reduced.

The cache unit is a module having a cache function. For example, the cache unit 33 includes a fourth inverter 331 and a fifth inverter 332. An input terminal of the fourth inverter 331 is connected to an output terminal of the fifth inverter 332, the check code transmission unit 31 and the data transmission unit 32. An output terminal of the fourth inverter 331 is connected to an input terminal of the fifth inverter 332 and serves as an output terminal of the cache unit 33. In this example, the cache unit is composed of two inverters. The check code transmission unit is implemented through a conventional device, such that the circuit structure can be further simplified, the integration level is improved, and the cost is reduced.

In practical applications, DDR5 further supports a data transmission mode of BL=32, i.e., outputting 32-bit data at one time. To improve the efficiency of data conversion, the data cache module can obtain a plurality of first signals for outputting at one time. Correspondingly, in one example, the first signal is 36-bit data, the first data signal is 32-bit data, and the first check code signal is four-bit data.

Figure 11:
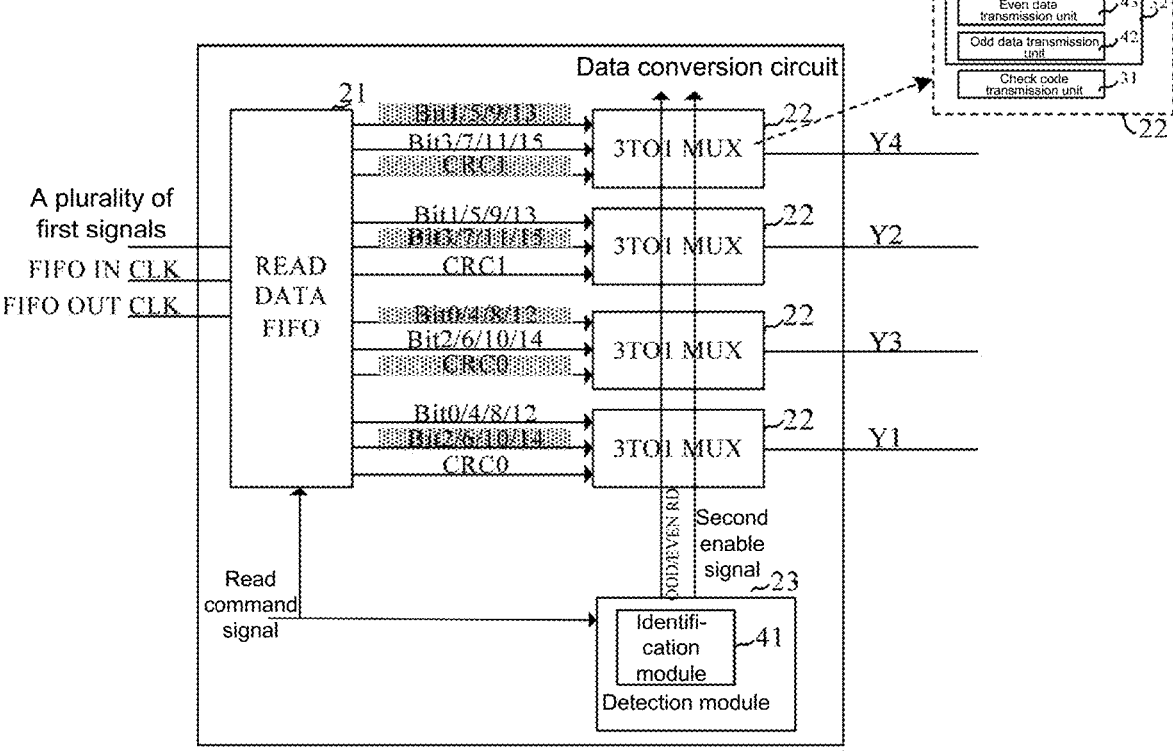
FIG. 11 is a schematic structural diagram of a data conversion circuit according to an embodiment.

In one example, as shown in FIG. 11, FIG. 11 is a schematic structural diagram of a data conversion circuit according to an embodiment. As shown in the figure, the first data signal includes a first group of N data sub-signals and a second group of N data sub-signals, the first check code signal includes a first group of check code sub-signals and a second group of check code sub-signals, the first enable signal includes a first enable sub-signal ODD RD and a second enable sub-signal EVEN RD. The detection module 23 further includes:

an identification module 41 configured to receive the read command signal and two initial clock signals, output the corresponding enable sub-signal according to one of the initial clock signals which firstly triggers the read command signal, and shield the other one of the initial clock signals and output the corresponding enable sub-signal, where the two initial clock signals include a first initial clock signal and a second initial clock signal having a same frequency and opposite phases.

The data transmission unit 32 includes a first data transmission unit 42 and a second data transmission unit 43, where the first data transmission unit 42 has a control terminal configured to receive the first enable sub-signal corresponding to the first initial clock signal, and is configured to receive the first group of N data sub-signals and output the first group of N data sub-signals when the first enable sub-signal is valid; and the second data transmission unit 43 has a control terminal configured to receive the second enable sub-signal corresponding to the second initial clock signal, and is configured to receive the second group of N data sub-signals and output the second group of N data sub-signals when the second enable sub-signal is valid.

Figure 12:
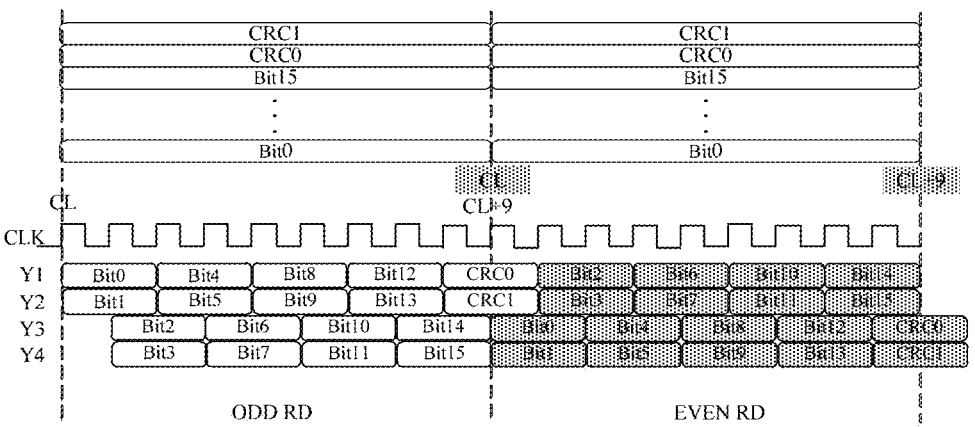
FIG. 12 is an example diagram of data conversion timing according to an example.

In practical applications, as shown in FIG. 12, FIG. 12 is a schematic diagram of data conversion timing according to an example. As shown in the figure, the unshaded Bit0-Bit15, CRC0 and CRC1 are the first group of signals, and the next shaded Bit0-Bit15, CRC0 and CRC1 are the second group of signals.

As shown in FIG. 12, for the first group of signals (unshaded data), the reading period of the first-bit data is located in the first two clock cycles corresponding to Y1, namely two clock cycles after CL. After nine clock cycles, the first group of signals is outputted. Specifically, the 18-bit signal is converted and outputted as five groups of signals, the first four groups are four-bit signals, and the last group is two-bit signals. After that, in the clock cycles after CL+9, CL+9 is taken as a reading start period of the second group of signals. For example, the clock cycle is started from CL again, and after nine clock cycles, read conversion processing is performed on the second group of signals. It should be noted that the "first group" of signals mentioned in this solution is only an example of a scene of a plurality of groups of signals, is exemplified as the previous data in two consecutive groups of signals, and is not limited to be the first signal in the actual reading scene. Similarly, the "second group" of signals mentioned in this solution is not limited to which signal it is specifically.

Specifically, for the second group of signals (shaded data in the figure), since CRC0 and CRC1 of the previous group of signals occupy two clock cycles, the reading period corresponding to the first-bit data Bit0 of the second group of signals is located after CL+9 on Y3. Therefore, when reading data, it is necessary to determine the time period when the first bit of the second group of signals starts to be read. This time period can be implemented by setting the first enable sub-signal and the second enable sub-signal.

As shown in FIG. 12, the read command signal of the first group of signals is matched with the first initial clock signal, and therefore, the first enable sub-signal is provided. The read command signal of the second group of signals is matched with the second initial clock signal, and therefore, the second enable sub-signal is provided. In one example, two initial clock signals are set. To generate the initial clock signal, in one example, the data conversion circuit further includes a clock frequency-doubling module. The clock frequency-doubling module is configured to receive the system clock signal, and process to generate the initial clock signal. The read command signal is determined through the initial clock signal. The identification module correspondingly outputs the first enable sub-signal and the second enable sub-signal, thereby sequentially processing a plurality of groups of signals.

Figure 13A:
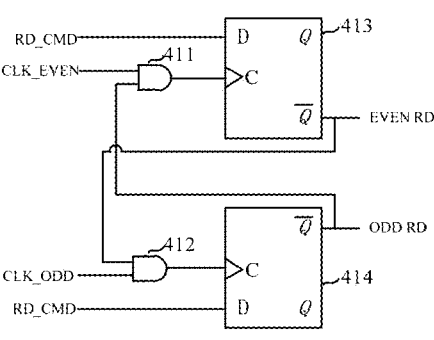
FIG. 13a is a schematic structural diagram of an odd/even identification module according to an example.

In one example, as shown in FIG. 13a, FIG. 13a is a schematic structural diagram of an identification module according to an example. As shown in the figure, the identification module 41 includes a first AND gate 411, a second AND gate 412, a second flip-flop 413, and a third flip-flop 414.

The first AND gate 411 has a first input terminal connected to the second initial clock signal (for example, CLK_EVEN in the figure), a second input terminal connected to a reverse output terminal of the third flip-flop 414, and an output terminal connected to a clock terminal of the second flip-flop 413.

The second AND gate 412 has a first input terminal connected to the first initial clock signal (for example, CLK_ODD in the figure), a second input terminal connected to a reverse output terminal of the second flip-flop 413, and an output terminal connected to a clock terminal of the third flip-flop 414.

An input terminal of the second flip-flop 413 and an input terminal of the third flip-flop 414 are configured to receive the read command signal RD_CMD.

Figure 13B:
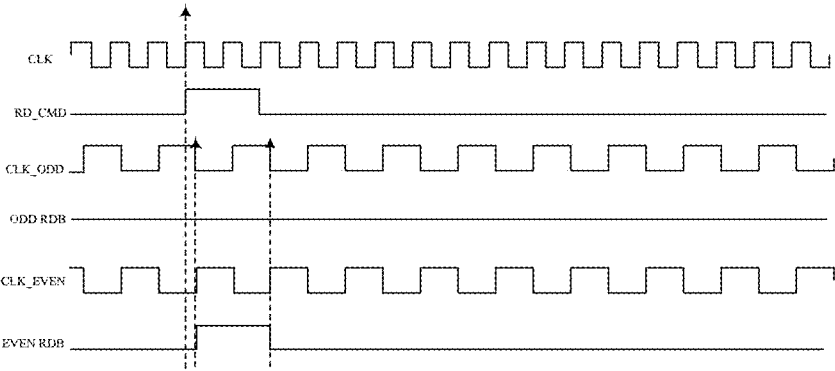
FIG. 13b is a signal timing diagram according to an example.

Specifically, the working principle is exemplified referring to the figure shown in the figure: as shown in FIG. 13b, FIG. 13b is a signal timing diagram according to an example. CLK is the system clock signal, RD_CMD is the read command signal, and CLK_ODD and CLK_EVEN are the initial clock signals. As shown in the figure, the cycle of the initial clock signals CLK_ODD and CLK_EVEN shown in the figure is twice that of the system clock signal, and the phases of CLK_ODD and CLK_EVEN are opposite. When a rising edge of the read command signal RD_CMD arrives, it is assumed that as shown in the figure, the rising edge of RD_CMD is firstly captured by a rising edge of CLK_EVEN, the other initial clock signal CLK_ODD is shielded at this time, and the enable sub-signal EVEN RD corresponding to CLK_EVEN currently outputted by the identification module is valid. It can be understood that similarly, if a rising edge of next RD_CMD is firstly captured by a rising edge of CLK_ODD, the enable sub-signal ODD RD corresponding to CLK_ODD outputted by the identification module is valid.

Specifically, different groups of signals may be transmitted through different transmission paths. For example, the data transmission unit includes a first data transmission unit and a second data transmission unit, which are respectively configured to transmit data of different groups of signals.

In one example, the first data transmission unit 42 includes a fourth flip-flop 422 and a third transmission gate 423, where the fourth flip-flop 422 has a data terminal configured to receive the first group of N data sub-signals, a clock terminal configured to receive the system clock signal, and an output terminal coupled to an input terminal of the third transmission gate 423; and the third transmission gate 423 has a control terminal configured to receive the first enable sub-signal ODD RD, and is turned on to output the first group of N data sub-signals when the first enable sub-signal ODD RD is valid. Due to the data transmission unit is implemented by the flip-flop and the transmission gate, the efficiency of data transmission can be improved and the power consumption can be reduced.

Figure 14:
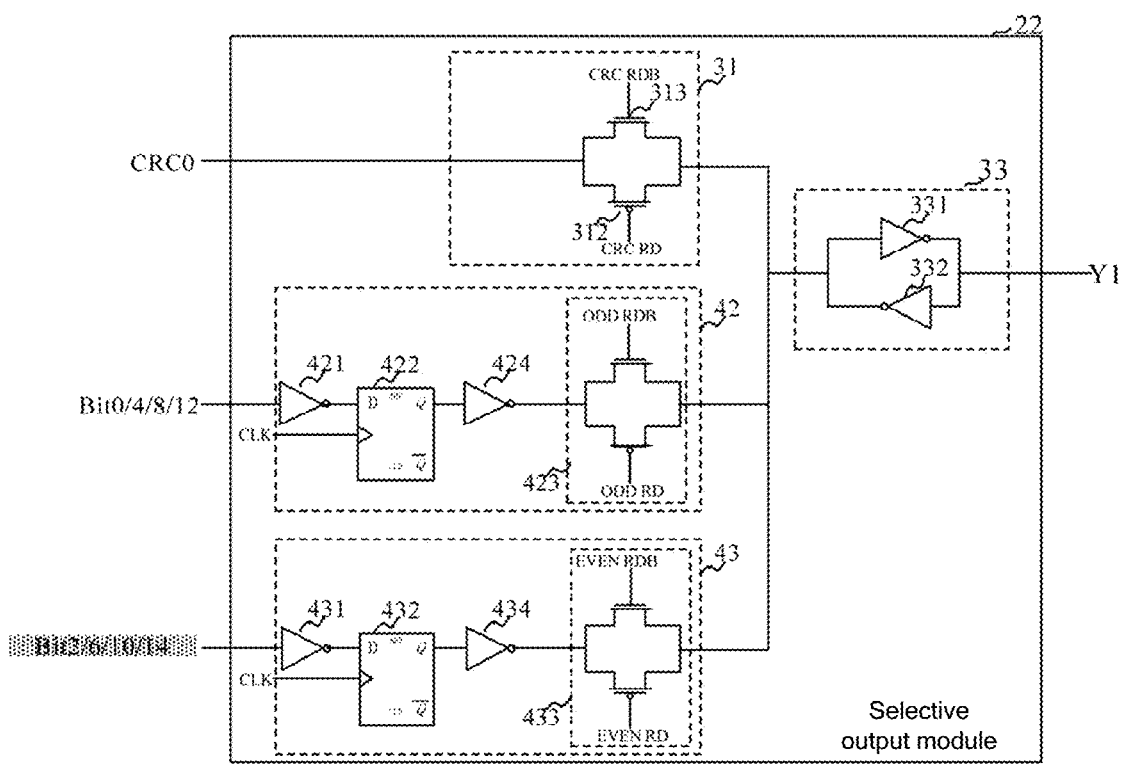
FIG. 14 is a schematic structural diagram of a selective output module according to an example.

For example, as shown in FIG. 14, FIG. 14 is a schematic structural diagram of a selective output module according to an example. In one example, the first data transmission unit 42 includes a sixth inverter 421, a fourth flip-flop 422, a third transmission gate 423, and a seventh inverter 424, and the third transmission gate 423 includes a third PMOS transistor and a third NMOS transistor. The sixth inverter 421 has an input terminal connected to the data cache module and an output terminal connected to an input terminal of the fourth flip-flop 422. The fourth flip-flop 422 has a clock terminal connected to the system clock signal and an output terminal connected to an output terminal of the seventh inverter 424. The output terminal of the seventh inverter 424 is connected to a source of the third PMOS transistor and a drain of the third NMOS transistor. The third PMOS transistor has a drain connected to a source of the third NMOS transistor and the cache unit, and a gate connected to the first enable sub-signal. A gate of the third NMOS transistor is connected to an inverted signal of the first enable sub-signal.

In one example, the second data transmission unit 43 includes a fifth flip-flop 432 and a fourth transmission gate 433, where the fifth flip-flop 432 has a data terminal configured to receive the second group of N data sub-signals, a clock terminal configured to receive the system clock signal, and an output terminal coupled to an input terminal of the fourth transmission gate 433; and the fourth transmission gate 433 has a control terminal configured to receive the second enable sub-signal EVEN RD, and is turned on to output the second group of N data sub-signals when the second enable sub-signal EVEN RD is valid. Due to the data transmission unit is implemented by the flip-flop and the transmission gate, the efficiency of data transmission can be improved and the power consumption can be reduced.

For example, still referring to FIG. 14, in one example, the second data transmission unit 43 includes an eighth inverter 431, a fifth flip-flop 432, a fourth transmission gate 433, and a ninth inverter 434, and the fourth transmission gate 433 includes a fourth PMOS transistor and a fourth NMOS transistor. The eighth inverter 431 has an input terminal connected to the data cache module and an output terminal connected to an input terminal of the fifth flip-flop 432. The fifth flip-flop 432 has a clock terminal connected to the system clock signal and an output terminal connected to an input terminal of the ninth inverter 434. The output terminal of the ninth inverter 434 is connected to a source of the fourth PMOS transistor and a drain of the fourth NMOS transistor. The fourth PMOS transistor has a drain connected to a source of the fourth NMOS transistor and the cache unit, and a gate connected to the second enable sub-signal. A gate of the fourth NMOS transistor is connected to an inverted signal of the second enable sub-signal.

Similarly, the inverter above mainly serves as a buffer, so the inverter may not be provided in a possible implementation. For example, the first data transmission unit and the second data transmission unit both include an inverter, a flip-flop, a PMOS transistor, an NMOS transistor and the like. The transmission unit is implemented through a conventional device, such that the circuit structure can be further simplified, the integration level is improved, and the cost is reduced.

Figure 15:
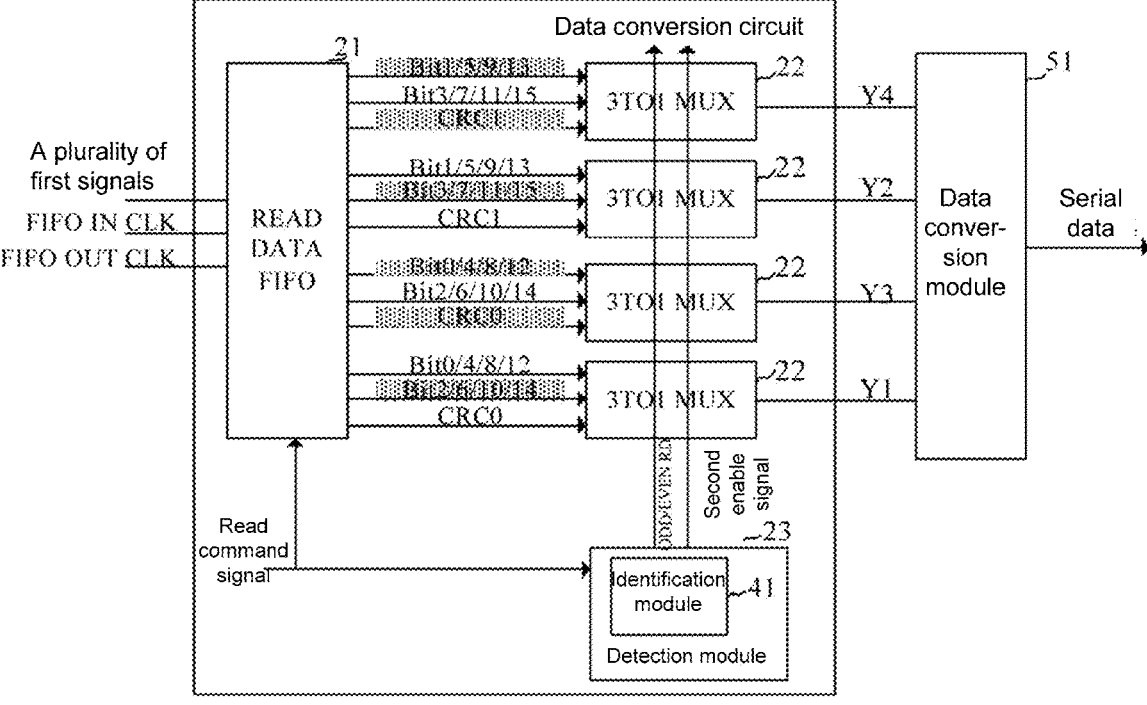
FIG. 15 is a schematic structural diagram of a data conversion circuit according to an embodiment.

In practical applications, it is necessary to perform parallel-to-series processing on the parallel read first signal. Therefore, the signal outputted by the selective output module may be continuously subjected to bit-reduction conversion until the serial data is obtained. The means of bit-reduction conversion is not limited. For example, the selective output module similar to the one introduced in the previous solution can still be configured to implement the bit-reduction conversion. That is to say, based on the setting of conversion times, multiple stages of selection output modules can be set, which is not limited in this embodiment. When the number of bits of the signal outputted by the selective output module is conveniently subjected to parallel-to-series processing, for example, when the data window for conversion processing can be guaranteed, parallel-to-series processing can be performed. Therefore, in one example, as shown in FIG. 15, FIG. 15 is a schematic structural diagram of a data conversion circuit according to an embodiment. As shown in the figure, the data conversion circuit further includes a data conversion module 51. The data conversion module 51 is configured to receive a signal outputted by the selective output module 22, and convert the signal to output corresponding serial data.

In one example, the data conversion module may be a data selector. For example, a clock signal of the data conversion module is a four-phase clock signal, a first phase is 0 degrees, a second phase is 90 degrees, a third phase is 180 degrees, and a fourth phase is 270 degrees.

Figure 16:
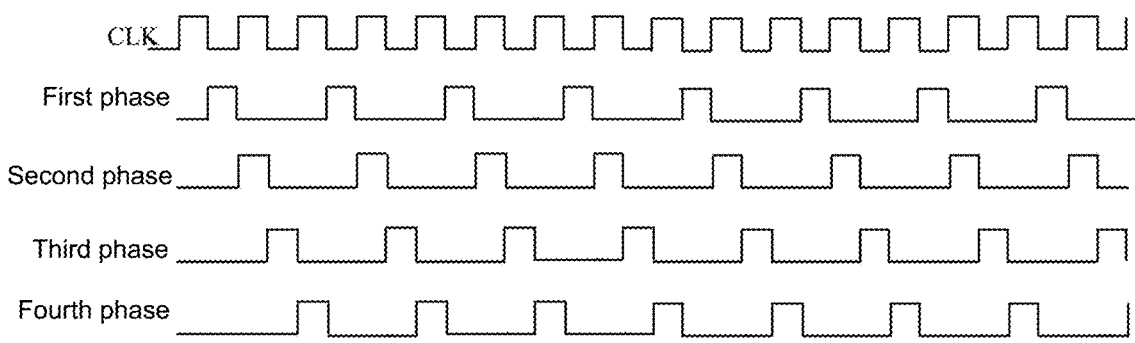
FIG. 16 is a schematic diagram of a clock signal of a data conversion module according to an example.

Taking the above scene as an example, the data conversion module (CLK MUX in the figure) receives the four-bit data outputted by the selective output module, and selectively outputs the data received by a corresponding input port in response to different clocks, to implement parallel-to-series processing. Specifically, taking an example referring to FIG. 12 and FIG. 16, FIG. 16 is a schematic diagram of a clock signal of a data conversion module according to an example. In the first period, Y1 channel of the selective output module outputs Bit0 of the first read data, Y2 channel of the selective output module outputs Bit1, Y3 channel of the selective output module outputs Bit2, and Y4 channel of the selective output module outputs Bit3. Correspondingly, the data conversion module selectively outputs the data of a Y1 channel, namely Bit in response to the clock signal of a first phase, selectively outputs the data of a Y2 channel, namely Bit1 in response to the clock signal of a second phase after a half clock cycle, selectively outputs the data of a Y3 channel, namely Bit2 in response to the clock signal of a third phase after a half clock cycle, and selectively outputs the data of a Y4 channel, namely Bit3 in response to the clock signal of a fourth phase after a half clock cycle, thereby converting the signals outputted by the selective output modules to serial data. Then, the remaining signals (such as the data signal and the check code signal) of the first signal are similarly processed until the whole read data is converted to serial data to be outputted.

In practical applications, to facilitate parallel-to-series processing, enough conversion time is retained, and a delay can be added between the first two bits and the last two bits of the data in the signal outputted by the selective output module. Referring to FIG. 12, for Bit0-Bit3 of the first signal outputted by the selective output module, when converting to the serial data, there is a delay of one system clock cycle between Bit0-Bit1 and Bit2-Bit3. Optionally, this delay can be added by the selective output module when outputting the signal.

In the data conversion circuit provided in this embodiment, the data cache module receives parallel signal consisting of a data part and a check code part, and splits and outputs same as a data signal and a check code signal. The detection module receives a read command signal, and outputs a corresponding enable signal according to the signal required to be transmitted currently being the first data signal or the first check code signal. The selective output module receives the data signal and the check code signal, and selectively outputs the data signal or the check code signal according to the enable signal received currently. In the above solution, the data signal and the check code signal of the parallel signal are controlled based on the enable signal to be outputted separately, which facilitates subsequent data conversion, thereby implementing effective read conversion of the parallel data including data and a check code.

Embodiment 2

Figure 17:
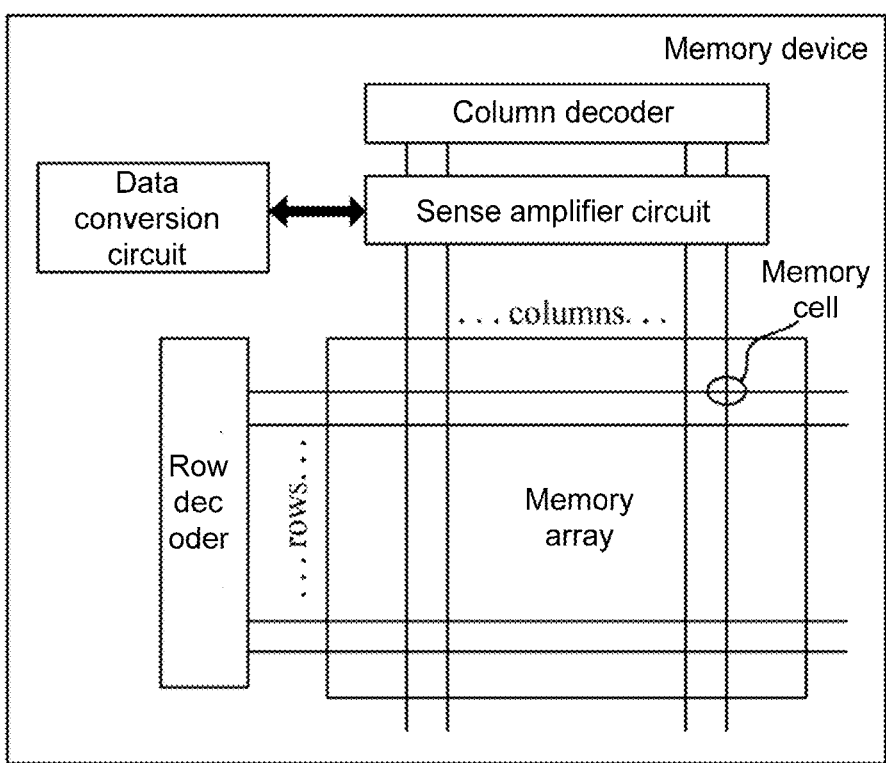
FIG. 17 is a schematic structural diagram of a memory device according to an embodiment.

FIG. 17 is a schematic structural diagram of a memory device according to an embodiment. As shown in FIG. 17, the memory device includes a memory array, a sense amplifier circuit, and the data conversion circuit as described in the previous example.

In a read mode, a multi-bit parallel first signal is generated by the sense amplifier circuit from data stored in the memory array, and transmitted to the data conversion circuit, where the first signal includes a first data signal and a first check code signal.

As shown in FIG. 17, taking the DRAM as an example, the memory device includes a data conversion circuit, a row decoder, a column decoder, a sense amplifier, and a memory array. The memory array mainly consists of rows and columns. Intersections between the rows along a row direction of the array and bit lines are memory cells of the memory array.

Each memory cell is configured to store data of one bit. The memory cell mainly consists of a transistor switch and a capacitor. The capacitor is configured to store data, and the transistor switch is turned off or on according to a selected state. A certain memory cell is activated by controlling a row and a column, to implement access to the memory cell. Taking a reading scenario as an example, when bit data in a memory cell needs to be read, a row (word line) in which the memory cell is located may be selected by the row decoder. Correspondingly, the transistor switch shown in the figure is turned on, and a state of the capacitor can be sensed in this case through sense amplification for a column (bit line) signal. For example, if the bit data stored in the memory cell is 1, 1 is read from the bit line of the memory cell after the transistor switch is turned on, and vice versa. In addition, taking a writing scenario as an example, when bit data, such as 1, needs to be written into a certain memory cell, a row (word line) in which the memory cell is located may be selected by the row decoder. Correspondingly, the transistor switch shown in the figure is turned on, and the column (bit line) is set to 1, such that the capacitor is charged, that is, 1 is written into the memory cell. On the contrary, if 0 needs to be written, the level of the bit line is set to 0, such that the capacitor is discharged, that is, 0 is written into the memory cell.

Referring to the solution of the previous embodiment, in the read mode, the read data is generated from the stored data in the memory array by the sense amplifier circuit, and the read data includes a data part and a check code part and is transmitted to the data conversion circuit. After bit-reduction-converting the received data, the data conversion circuit outputs the serial data, thereby completing the data reading and outputting.

According to the memory device provided in this embodiment, the stored data in the memory array is generated by the sense amplifier circuit to generate the read data including the check code and the data part, and is transmitted to the data conversion circuit for bit-reduction-conversion until the serial data is finally outputted. In the above solution, the data conversion circuit controls the data signal and the check code signal of the parallel signal based on the enable signal to be outputted separately, which facilitates subsequent data conversion, thereby implementing effective read conversion of the parallel data including data and a check code.

Those skilled in the art may easily figure out other implementation solutions of the present disclosure after considering the specification and practicing the invention disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that the present disclosure is not limited to the precise structures described above and shown in the accompanying drawings, and can be modified and changed in many ways without departing from the scope of the present disclosure. The scope of the present disclosure is defined by the appended claims.

The invention claimed is:

1. A data conversion circuit, comprising a data cache module, a selective output module, and a detection module, wherein the data cache module is configured to receive a multi-bit parallel first signal, wherein the first signal comprises a first data signal and a first check code signal;

the detection module is configured to receive a read command signal, and output a corresponding enable signal according to a signal required to be transmitted currently being the first data signal or the first check code signal, wherein the enable signal comprises a first enable signal corresponding to the first data signal or a second enable signal corresponding to the first check code signal; and the selective output module is coupled to the data cache module and the detection module, and is configured to receive the first signal and selectively output the first data signal or the first check code signal based on the enable signal;

wherein there are N selective output modules;

the data cache module is configured to divide the first data signal into N data sub-signals and divide the first check code signal into M check code sub-signals based on bits; and the data cache module is further configured to respectively output the data sub-signals and the check code sub-signals to the N selective output modules in a manner of outputting the first signal in parallel, wherein a data volume in each data sub-signal does not exceed a number of the selective output modules;

wherein, M and N are positive integer;

wherein the selective output module comprises a check code transmission unit and a data transmission unit, wherein the check code transmission unit is coupled to the data cache module, has a control terminal configured to receive the second enable signal, and is configured to receive the first check code signal and output the first check code signal in response to the second enable signal is valid; and the data transmission unit is coupled to the data cache module, has a control terminal configured to receive the first enable signal, and is configured to receive the first data signal and output the first data signal in response to the first enable signal is valid;

wherein the first signal is 36-bit data, the first data signal is 32-bit data, and the first check code signal is four-bit data;

wherein the first data signal comprises a first group of N data sub-signals and a second group of N data sub-signals, the first check code signal comprises a first group of check code sub-signals and a second group of check code sub-signals, the first enable signal comprises a first enable sub-signal and a second enable sub-signal; the detection module further comprises:

an identification module, configured to receive the read command signal and two initial clock signals, output corresponding enable sub-signal according to one of the initial clock signals which firstly triggering the read command signal, and shield the other of the initial clock signals and output the corresponding enable sub-signal, wherein the two initial clock signals comprise a first initial clock signal and a second initial clock signal having a same frequency and opposite phases; and the data transmission unit comprises a first data transmission unit and a second data transmission unit, wherein the first data transmission unit has a control terminal configured to receive the first enable sub-signal corresponding to the first initial clock signal, and is configured to receive the first group of N data sub-signals and output the first group of N data sub-signals in response to the first enable sub-signal is valid; and the second data transmission unit has a control terminal configured to receive the second enable sub-signal corresponding to the second initial clock signal, and is configured to receive the second group of N data sub-signals and output the second group of N data sub-signals in response to the second enable sub-signal is valid.

2. The circuit according to claim 1, wherein the first signal is eighteen-bit data, the first data signal is sixteen-bit data, and the first check code signal is two-bit data.

3. The circuit according to claim 1, wherein the detection module comprises a clock counting module and a signal generating module, wherein the clock counting module is configured to reset and count, in response to receiving the read command signal, a number of system clock cycles since receiving the read command signal; and the signal generating module is coupled to the clock counting module, and is configured to output the first enable signal in response to the number of system clock cycles counted by the clock counting module does not reach a first threshold, and output the second enable signal in response to the number of system clock cycles counted by the clock counting module reaches the first threshold, wherein the first threshold is set based on a length of the first data signal.

4. The circuit according to claim 1, wherein sequential logic of a plurality of the selective output modules is configured; and the data cache module is configured to output the first signal to corresponding selective output modules according to the sequential logic.

5. The circuit according to claim 1, wherein the check code transmission unit comprises a first transmission gate, wherein the first transmission gate has a control terminal configured to receive the second enable signal, and is turned on to output the first check code signal in response to the second enable signal is valid.

6. The circuit according to claim 1, wherein the data transmission unit comprises a first flip-flop and a second transmission gate, wherein the first flip-flop has a data terminal configured to receive the first data signal, a clock terminal configured to receive a system clock signal, and an output terminal coupled to an input terminal of the second transmission gate; and the second transmission gate has a control terminal configured to receive the first enable signal, and is turned on to output the first data signal in response to the first enable signal is valid.

7. The circuit according to claim 1, wherein the selective output module further comprises:

a cache unit, coupled to the check code transmission unit and the data transmission unit, and is configured to cache and output a signal received currently.

8. The circuit according to claim 1, wherein the identification module comprises a first AND gate, a second AND gate, a second flip-flop, and a third flip-flop, wherein the first AND gate has a first input terminal receive the second initial clock signal, a second input terminal connected to a reverse output terminal of the third flip-flop, and an output terminal connected to a clock terminal of the second flip-flop;

the second AND gate has a first input terminal receive the first initial clock signal, a second input terminal connected to a reverse output terminal of the second flip-flop, and an output terminal connected to a clock terminal of the third flip-flop; and an input terminal of the second flip-flop and an input terminal of the third flip-flop are configured to receive the read command signal.

9. The circuit according to claim 1, wherein the first data transmission unit comprises a fourth flip-flop and a third transmission gate, wherein the fourth flip-flop has a data terminal configured to receive the first group of N data sub-signals, a clock terminal configured to receive a system clock signal, and an output terminal coupled to an input terminal of the third transmission gate; and the third transmission gate has a control terminal configured to receive the first enable sub-signal, and is turned on to output the first group of N data sub-signals in response to the first enable sub-signal is valid.

10. The circuit according to claim 1, wherein the second data transmission unit comprises a fifth flip-flop and a fourth transmission gate, wherein the fifth flip-flop has a data terminal configured to receive the second group of N data sub-signals, a clock terminal configured to receive a system clock signal, and an output terminal coupled to an input terminal of the fourth transmission gate; and the fourth transmission gate has a control terminal configured to receive the second enable sub-signal, and is turned on to output the second group of N data sub-signals in response to the second enable sub-signal is valid.

11. The circuit according to claim 1, further comprising a clock frequency-doubling module, wherein the clock frequency-doubling module is configured to receive a system clock signal, and process to generate the initial clock signal.

12. The circuit according to claim 1, wherein there are four selective output modules.

13. The circuit according to claim 11, further comprising a data conversion module, wherein the data conversion module is configured to receive a signal outputted by the selective output module, and convert the signal to output corresponding serial data.

14. The circuit according to claim 13, wherein a clock signal of the data conversion module is a four-phase clock signal, a first phase is 0 degrees, a second phase is 90 degrees, a third phase is 180 degrees, and a fourth phase is 270 degrees.

15. The circuit according to claim 1, wherein the data cache module comprises a first-in first-out data cache, wherein the first-in first-out data cache comprises a data input terminal, an input clock signal terminal, and an output clock signal terminal.

16. A memory device, comprising a memory array, a sense amplifier circuit, and the a data conversion circuit according to claim 1, comprising a data cache module, a selective output module, and a detection module, wherein the data cache module is configured to receive a multi-bit parallel first signal, wherein the first signal comprises a first data signal and a first check code signal;

the detection module is configured to receive a read command signal, and output a corresponding enable signal according to a signal required to be transmitted currently being the first data signal or the first check code signal, wherein the enable signal comprises a first enable signal corresponding to the first data signal or a second enable signal corresponding to the first check code signal; and the selective output module is coupled to the data cache module and the detection module, and is configured to receive the first signal and selectively output the first data signal or the first check code signal based on the enable signal;

wherein there are N selective output modules;

the data cache module is configured to divide the first data signal into N data sub-signals and divide the first check code signal into M check code sub-signals based on bits; and the data cache module is further configured to respectively output the data sub-signals and the check code sub-signals to the N selective output modules in a manner of outputting the first signal in parallel, wherein a data volume in each data sub-signal does not exceed a number of the selective output modules;

wherein, M and N are positive integer;

wherein the selective output module comprises a check code transmission unit and a data transmission unit, wherein the check code transmission unit is coupled to the data cache module, has a control terminal configured to receive the second enable signal, and is configured to receive the first check code signal and output the first check code signal in response to the second enable signal is valid; and the data transmission unit is coupled to the data cache module, has a control terminal configured to receive the first enable signal, and is configured to receive the first data signal and output the first data signal in response to the first enable signal is valid;

wherein the first signal is 36-bit data, the first data signal is 32-bit data, and the first check code signal is four-bit data;

wherein the first data signal comprises a first group of N data sub-signals and a second group of N data sub-signals, the first check code signal comprises a first group of check code sub-signals and a second group of check code sub-signals, the first enable signal comprises a first enable sub-signal and a second enable sub-signal; the detection module further comprises:

an identification module, configured to receive the read command signal and two initial clock signals, output corresponding enable sub-signal according to one of the initial clock signals which firstly triggering the read command signal, and shield the other of the initial clock signals and output the corresponding enable sub-signal, wherein the two initial clock signals comprise a first initial clock signal and a second initial clock signal having a same frequency and opposite phases; and the data transmission unit comprises a first data transmission unit and a second data transmission unit, wherein the first data transmission unit has a control terminal configured to receive the first enable sub-signal corresponding to the first initial clock signal, and is configured to receive the first group of N data sub-signals and output the first group of N data sub-signals in response to the first enable sub-signal is valid; and the second data transmission unit has a control terminal configured to receive the second enable sub-signal corresponding to the second initial clock signal, and is configured to receive the second group of N data sub-signals and output the second group of N data sub-signals in response to the second enable sub-signal is valid wherein in a read mode, the multi-bit parallel first signal is generated by the sense amplifier circuit from data stored in the memory array, and transmitted to the data conversion circuit, wherein the first signal comprises the first data signal and the first check code signal.

* * * * *